United States Patent [19]

Berndt et al.

[11] Patent Number: 5,299,211
[45] Date of Patent: Mar. 29, 1994

[54] LASER GYRO HIGH VOLTAGE START MODULE AND HIGH VOLTAGE PULSE GENERATOR

[75] Inventors: Dale F. Berndt, Plymouth; Joseph E. Killpatrick, Minneapolis, both of Minn.

[73] Assignee: Honeywell Inc., Minneapolis, Minn.

[21] Appl. No.: 936,155

[22] Filed: Aug. 27, 1992

[51] Int. Cl.[5] .................. H01S 3/083; G01C 19/64
[52] U.S. Cl. ........................... 372/94; 372/38; 356/350
[58] Field of Search ............. 372/94, 38; 356/350

[56] References Cited
U.S. PATENT DOCUMENTS

| | | | |
|---|---|---|---|
| 4,282,495 | 8/1981 | Ljung | 372/94 |
| 4,641,970 | 2/1987 | Gustafson et al. | 356/350 |
| 4,740,085 | 4/1988 | Lim | 356/350 |
| 4,751,718 | 6/1988 | Hanse et al. | 372/94 |
| 5,088,824 | 2/1992 | Killpatrick et al. | 356/350 |
| 5,100,235 | 3/1992 | Priddy et al. | 356/350 |

Primary Examiner—Georgia Y. Epps
Attorney, Agent, or Firm—Ronald E. Champion; Craig J. Lervick

[57] ABSTRACT

A high voltage start circuit includes a high voltage start module and high voltage pulse generator apparatus. The high voltage pulse generator amplifies a five volt pulse at 60 KHz duty cycle to an output of 280 volts pulses at approximately 50% duty cycle. A PN junction high voltage diode with a high forward voltage drop and a resistor divider drives and holds a first transistor out of saturation. A low voltage diode creates a dead band such that two high voltage start module transistors are never on at the same time. The high voltage module contains two high voltage blocking diodes which protect the laser gyro active current control circuitry during start up. Two small ballast resistors and a parallel 10 times voltage multiplier generate at least a 2500 VDC output. The high voltage start circuit is contained within a laser gyro housing and is configured to have a volume less than the volume of the ring laser gyro block.

27 Claims, 8 Drawing Sheets

LASER GYRO HIGH VOLTAGE START MODULE AND HIGH VOLTAGE PULSE GENERATOR

This invention relates generally to laser gyros and, more particularly, to a method and apparatus for starting a laser gyro with high voltage generated within the housing containing the laser gyro from a low voltage supply.

BACKGROUND OF THE INVENTION

Ring laser angular rate sensors, often referred to as ring laser gyros, are well known. One example of a ring laser angular rate sensor is U.S. Pat. No. 4,751,718 issued to Hanse, et al., which is incorporated herein by reference. Present day ring laser angular rate sensors include a thermally and mechanically stable laser block having a plurality of interconnected formed cavities. Mirrors are placed at the extremities of the cavities for reflecting laser beams and providing an optical closed-looped path.

Prior art high voltage power supplies for laser gyros used a 2,500 VDC large external power supply placed outside of the laser gyro housing. The external supply required high voltage feed-throughs into the laser gyro housing through a high voltage feed-through connector. Such high voltage feed-throughs are expensive. Such high voltage feed-through connectors are also difficult to construct while still maintaining a hermetic seal for the laser gyro housing. Existing high voltage plastic seals can only maintain a vacuum to $10^{-6}$ Torr. In contrast, relatively inexpensive low voltage connector seals can handle a $10^{-9}$ Torr hermetic seal.

It is, therefore, one motive of the invention to provide a laser gyro incorporating voltage supply lines that can utilize an inexpensive, hermetic connector.

SUMMARY OF THE INVENTION

The invention provides a laser gyro high voltage start circuit including a high voltage pulse generator and high voltage module that allow the external gyro voltage supply to provide low voltages of +5 VDC and +15 VDC, with an inexpensive hermetic connector. The high voltage pulse generator amplifies a five volt pulse at 60 KHz duty cycle to provide an output of 280 volt pulses at approximately a 50% duty cycle. The high voltage pulse generator features first and second transistors for shaping an output waveform. The high voltage pulse generator uses a PN junction high voltage diode with a high forward voltage drop and a resistor divider to drive the first transistor while holding the first transistor out of saturation. The high voltage pulse generator also uses a low voltage diode to create a dead band such that the first and second transistors are never on at the same time. The high voltage module comprises two high voltage blocking diodes which protect the laser gyro active current control circuitry during start up. Two small ballast resistors and a parallel 10 times voltage multiplier provide an at least 2500 VDC output. The high voltage start circuit is configured to be contained in a volume which is smaller than the volume of a ring laser gyro block.

Other objects, features and advantages of the present invention will become apparent to those skilled in the art through the Description of the Preferred Embodiment, Claims, and Drawings herein wherein like numerals refer to like elements.

DESCRIPTION OF THE PREFERRED EMBODIMENT

Figure 1:
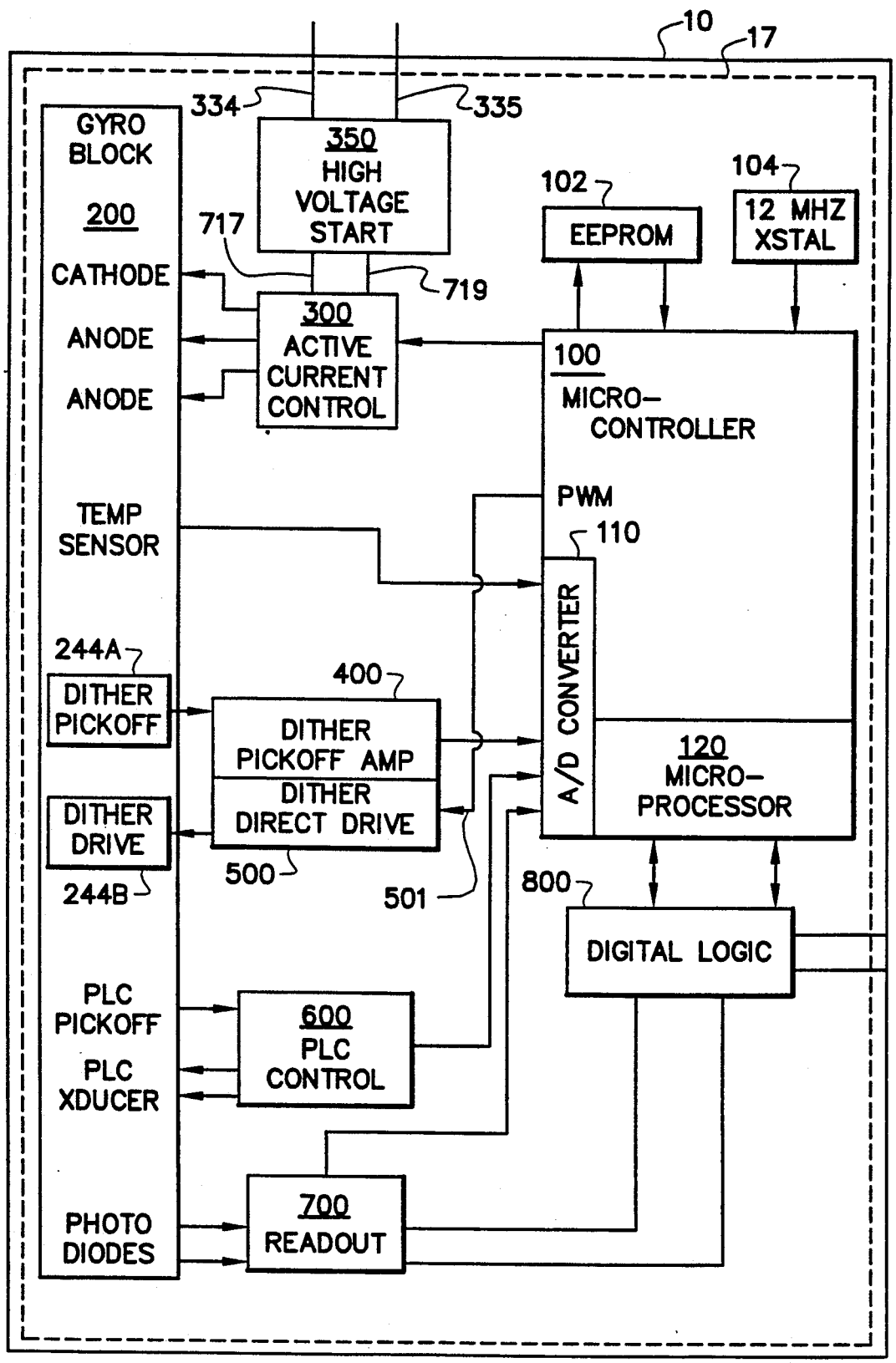
FIG. 1 shows a block diagram of one embodiment of a ring laser gyro employing the novel features of the present invention.

Referring now to FIG. 1, a schematic block diagram of one embodiment of a ring laser gyro employing the novel features of the present invention is shown. The present invention will be explained by way of example embodiments. Those skilled in the art having the benefit of this disclosure will appreciate that the examples herein are by way of illustration of the principles of the invention and not by way of limitation.

Ring laser gyro 10 includes a controller 100, a ring laser gyro block 200, an active current control 300, dither pickoff amplifier 400, direct digital dither drive 500, a path length control (PLC) device 600, a readout 700, and digital logic 800. The laser gyro 10 further comprises a high voltage start module 350 providing power to the laser block 200 and active current control 300. The controller 100 may be a microprocessor or microcontroller. One useful microcontroller is the Intel model 80C196KC.

Figure 2A:
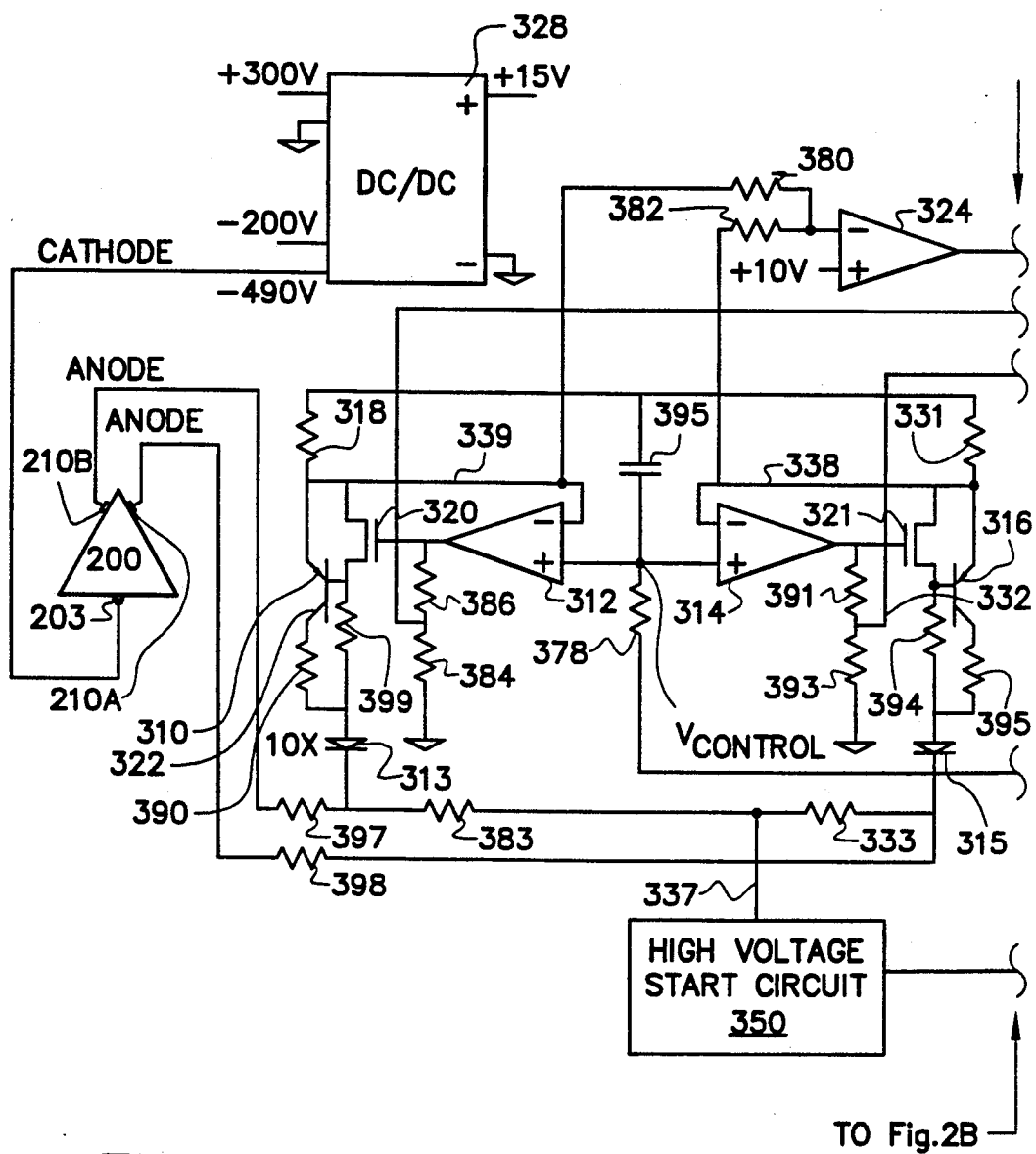
FIG. 2A and 2B schematically show a circuit diagram of one example of an active current control circuit made in accordance with the present invention.
Figure 2B:
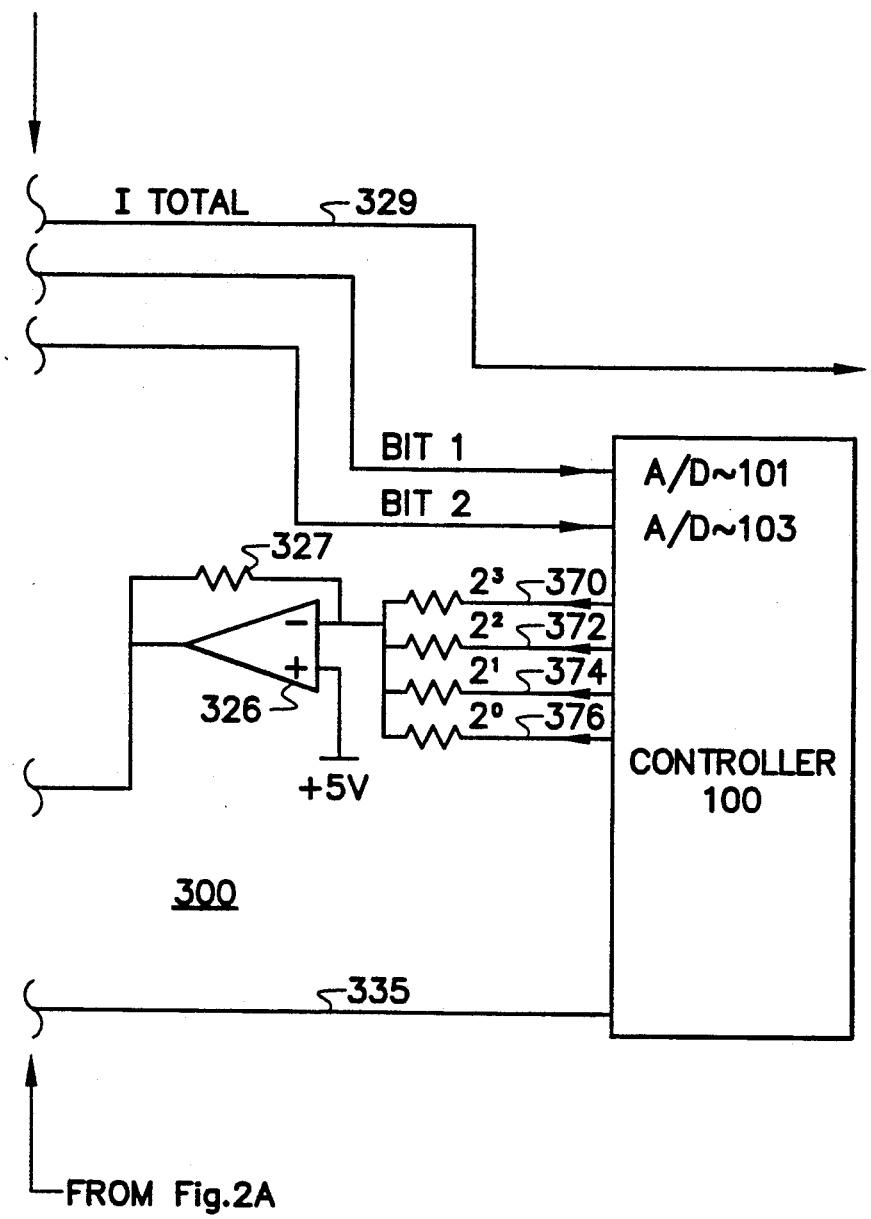

Referring now to FIG. 2A and 2B, a more detailed circuit diagram of one example of an active current control apparatus is shown. The gyro block 200 is illustrated as a triangular block having two anodes 201A, 201B and a cathode 203. Those skilled in the art will understand that the ring laser gyro block can comprise other polygonal shapes, such as rectangular. Those skilled in the art will also recognize that various combinations and numbers of electrodes including anodes and cathodes may be used in the ring laser gyro without departing from the scope of this invention.

The laser gyro of one embodiment of the invention includes an active current control apparatus. The active current control apparatus 300 in this example includes first, second, third and fourth amplifying means 312, 314, 324, 326, first and second output transistor means 310, 316, first and second field effect transistor (FET) means 320, 321, DC/DC conversion means 328 and high voltage start circuit means 350. The active current control apparatus 300 is coupled to controller 100 and the ring laser gyro block 200.

The fourth amplifying means 326 is coupled to a gain resistor 327 at its inverting input. Also coupled to the inverting input are four input resistors 370, 372, 374 and 376. The controller 100 operates to generate a digital control signal onto the four input resistors. The fourth amplifying means 326 substantially functions as a digital-to-analog converter wherein the four input resistors correspond to a four bit input in which the first input resistor 370 is the most significant bit and the fourth input resistor 376 is the least significant bit. The fourth amplifying means translates the digital control input from the controller 100 into a proportionate analog signal which is applied through resistor 378 to node $V_{control}$. Thus the active current control 300 can be controlled to within 4 bits of accuracy at node $V_{control}$ which correspond to a 10 volt to 5 volt swing at $V_{control}$.

$V_{control}$ is further coupled to the non-inverting inputs of the first and second amplifying means 312, 314. Each of the first and second amplifying means 312 and 314 drives a field effect transistor 320, 321 which, in turn, control transistors 310, 316 through which current flows to one of the anodes 201A and 201B on gyro block 200. Each of the first and second amplifying means and their associated components may be considered as one "leg" of the active current control. The output of the first amplifier 312, for example, is connected to the gate of a field effect transistor (FET) 320. FET 320 may advantageously be a DMODE FET having a threshold of from about −2 to −4 volts or an equivalent device. FET 320 may advantageously be, for example, an N channel FET such as a JFET or MOSFET with sufficiently low gate impedance to allow substantially all of the current in precision resistors 318, 331 to flow to anodes 210A and 210B. FET 320 controls the base drive to high frequency transistor 310. Feedback line 339 provides negative feedback to the first current control amplifier 312. The source of FET 320 is connected to feedback line 339. The drain of FET 320 is connected to the base of the first output transistor 31?. The emitter of the first output transistor 310 is connected to the feedback line 339 and through resistor 318 to a first terminal of capacitor 396. The second terminal of capacitor 396 is connected to the node $V_{control}$.

In one embodiment of the invention, when fully charged, capacitor 396 maintains a nominal voltage potential of about +10 volts at its first terminal. The first output transistor 310 has its collector 322 connected through a resistor 390 to the anode of diode 313. Diodes 313 and 315 are high voltage diodes rated at, for example, about 5,000 volts, and serve to protect the active current control circuitry during start up of the ring laser gyro. The base of output transistor 310 is connected to the source of FET 320 and a resistor 399. Resistor 399 is also connected to the anode of diode 313. The cathode of diode 313 is connected through resistor 397 to anode 201B. The second amplifying means 314 is similarly arranged with its associated components, namely, FET 321, the second output transistor 316 and resistance components 391, 393, 394, 331, 333 and the second diode 315 which is connected at its cathode to the second anode 201A. The first amplifying means 312 comprises a first leg of the driving circuit and the second amplifying means 314 and its associated components comprises a second leg of the circuit. Both legs operate in a similar manner to supply substantially equal current to the ring laser gyro. The first and second amplifying means 312, 314 may advantageously comprise operational amplifiers such as, for example, model number LM 2902 having less than about a 1 MHz bandwidth. The first and second transistors 310, 316 may advantageously be slightly reversed biased by 10 volts from base to collector in one example embodiment of the invention. This reverse bias reduces the effective capacitance between the base and collector, thereby improving the transistors' high frequency response.

A third amplifier means 324 may advantageously, optionally be included to provide an output signal 329 which is representative of the sum of the current in each leg of the ring laser gyro. The current sum is designated "I Total". An inverting input of the third amplifier means 324 is connected through resistor 380 to feedback line 339 and through resistor 382 to feedback line 338.

In this example, the cathode 203 of the ring laser gyro is kept at a constant voltage of, for example, in the range of about −425 to −460 volts through DC/DC converter means 328. In operation, DC/DC converter means 328 converts an input voltage of about +15 volts from an external power source to, for example, an output voltage of nominally in the range of about −450 to −490 volts.

Also optionally included in this example of an active current control are built in test lines BIT 1 and BIT 2. BIT 1 and BIT 2 are coupled to first and second analog-to-digital inputs 101, 103 respectively of controller 100. BIT 1 and BIT 2 provide test signals which are employed by controller 100 to determine whether or not the active current control is in the proper operating range and that the operational amplifiers 312, 314 are not locked up at the high or low power supply limits. These limits are also called positive and negative rails respectively herein.

One example of a built-in-test that may be employed with the present invention is a high limit test coupled with a low limit test. The high limit test uses the controller 100 to supply a digital command signal to the fourth amplifying means 326 that corresponds to a predetermined upper limit for total current. The BIT 1 and BIT 2 signals are then read by the controller 100 and compared by well known comparison means to a nominally acceptable maximum value. Similarly, the low limit test may test the active current control apparatus for a nominally acceptable minimum value. In this way the circuit apparatus can be tested to assure that the apparatus and the ring laser gyro are operating within acceptable limits and are not, for example, operating in a range too near the rails. For example, if one of the legs in the ring laser gyro failed to ignite, this condition would be an indication that one of the operational amplifiers 312, 314 was locked up at the positive rail.

It is important to the operation of each leg of the active current control to carefully select the resistors at the output of the current supply legs. For the first leg resistors 390, 399 and 397 must be selected according to the equations listed hereinbelow. Similarly, care must be taken in selecting resistors 395, 394 and 333 in the second leg of the active current control. In the first leg, for example, resistors 390 and 399 must be selected such that the voltage on collector 322 of transistor 310 remains relatively constant over the operating range of the current in the ring laser gyro. In one example of the invention, resistors 390, 399 and 397 and their counter parts 394, 395 and 333 were selected to operate for a worst case BETA of 10 for pNp transistor 310, 316 at low currents and low temperatures of about −55 degrees centigrade. The selection of these resistors minimizes power dissipation in the transistors 310 and 316. In one example, current is supplied in the range of about 0.15 to 1 ma per leg. These limits are established by the impedance characteristics of the gas discharge and the current limits of the power supply.

It should be noted here that the active current control of the invention takes advantage of the negative resistance inherent in the ring laser gyro tube. That is, as the gyro demands higher current the voltage from the anode to the cathode drops. The invention selects a ratio for R1 and R2 such that the base drive current through R2 increases as current demand for the ring laser gyro tube increases. The resistors R1 and R3 are particularly selected to minimize the power dissipation in transistor 310 at the maximum current. The following equations illustrate a method employed by the current invention to select resistors R1, R2 and R3 in order to operate with a Beta of 10 or less in the PNP transistor 310.

1. A quadratic fit to current-voltage characteristics over the RLG negative resistance region $I_A = 0.15$ to 1 ma is done using the following equation:

$$V_T = K_0 + K_1 I_A + K_2 I^2_A + \Delta V_{TEMP} + \Delta V_{PROCESS}$$

where:
$V_T$ = Tube Voltage;
$V_{TL}$ = Tube Voltage at low Temperature;
$V_{TH}$ = Tube Voltage at high Temperature;
$V_C$ = Cathode Voltage;
$I_A$ = Anode Current (one leg);
$V_{CE}$ = the transistor collector-emitter voltage; and
$K_0$, $K_1$ and $K_2$ are constants for the quadratic fit equation which are specific to the I-V characteristics of the laser discharge in the ring laser gyro being modeled by these equations. The conditions for R2 are set as follows:

2. $R2 > V_C - V_{TL}/I_{Amin}$
3. $R2 > dV_T/dI_A$ at lowest current.
4.

$$R2/R1 < \beta min$$

R1 and R3 must satisfy the following equations:
5.

$$R1 + R3 = \frac{V_C - V_{TL} - V_{CEmax}}{I_{Amax}}$$

6.

$$R1 + R3 = \frac{V_C - V_{TH} - V_{CEmin}}{I_{Amin}}$$

7. It is important to note that a PNP transistor has a larger BETA characteristic at $-55°$ C. and lower current when compared to an NPN transistor. Therefore, PNP transistors are preferably used as the current source transistors.

8. In one example an SOT—23 packaged transistor dissipates less than 100 mw at $-55°$ C. for maximum current.

9. In one example an MMBT6520 transistor was employed having the following frequency characteristic:

$$F_t = 40 MHz$$

where $$C_{cb} < 6 pF$$

10. Collector reverse biased by >10 volts to reduce base-collector capacitance.

11. From operating window data taken at Honeywell Inc. it has been found for certain ring laser gyros that if $R3 > 10K$ for $C_{cb} < 6$ pF, then the operating window is reduced <5%.

All the above conditions are met with: R1=50K, R2=421K, and R3=30K in one embodiment of the invention.

The Active Current Control apparatus of the invention may be built with $V_C$ Fixed or Variable to reduce power consumption. A fixed $V_C$ approach with proper selection of R1, R2, and R3 allows operation with low Beta. The negative resistance of the IV characteristic is used as an advantage to increase base drive at high currents.

Figure 3:
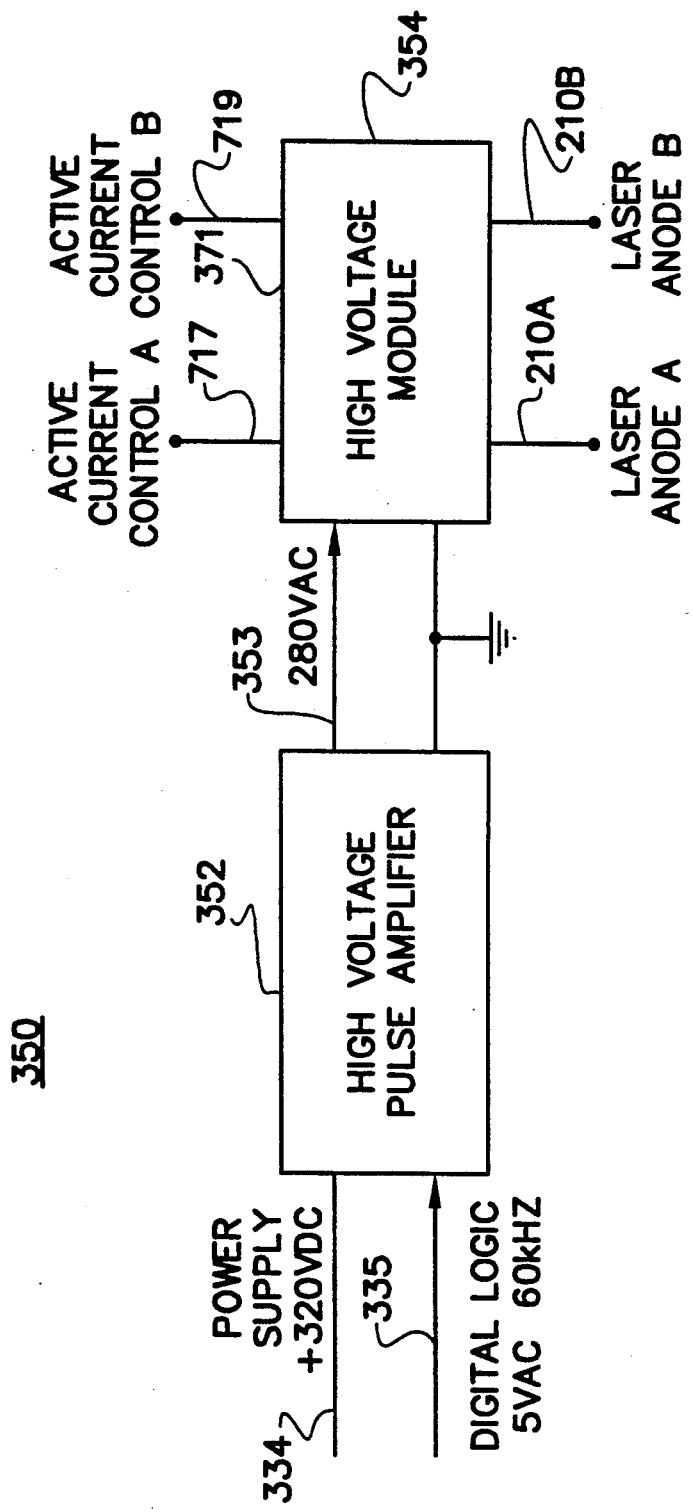
FIG. 3 schematically shows a block diagram of one embodiment of a high voltage start circuit as provided by one aspect of the invention.

Referring now to FIGS. 1A, 2B and 3, also included in the active current apparatus is high voltage start circuit 350 which is coupled through line 337 and resistors 333 and 383 to anode 210A and 210B of ring laser gyro 10. The circuit of FIG. 3 is employed during the start mode of the ring laser gyro 10. At line 335, in this example, controller 100 supplies a 0 to 5 volts square wave at a frequency of about 60 KHz with a 10% duty cycle on line 335 which is input to the high voltage start circuit 350. The high voltage start circuitry 350 comprises a 280 volt pulse generator 352 and a voltage multiplier circuit 354. The pulse generator 352 is used to step up the input voltage square wave, $V_{IN}$, on line 335 to a 280 volt signal represented by the waveform 335WF shown in FIG. 5A. The 280 volt peak-to-peak signal output line 353 is also a 60 KHz signal having a 50% duty cycle which is fed into the voltage multiplier circuit 354. Voltage multiplier circuit 354 then outputs a high DC voltage of about 2500 volts. The 280 VAC output waveform 353WF is shown in FIG. 5B.

The high voltage supply 334 (+32 VDC) high voltage pulse generator 352 and high voltage module 371 are all contained in the gyro housing 17. This eliminates the need for an external high voltage supply, and thus external high voltage supply cables and seals. The high voltage pulse generator 352 amplifies 5 V pulses to 280 volt pulses. The 280 VAC pulses are then amplified and rectified by a parallel 10X multiplier. The multiplier 354 is shown in more detail in FIG. 6. Multiplier 354 provides at least 2,500 volts needed to start the gyro 10. The high voltage module 371 also contains two small ballast resistors of 10K ohm to 30ohm and two high voltage blocking diodes.

Figure 4:
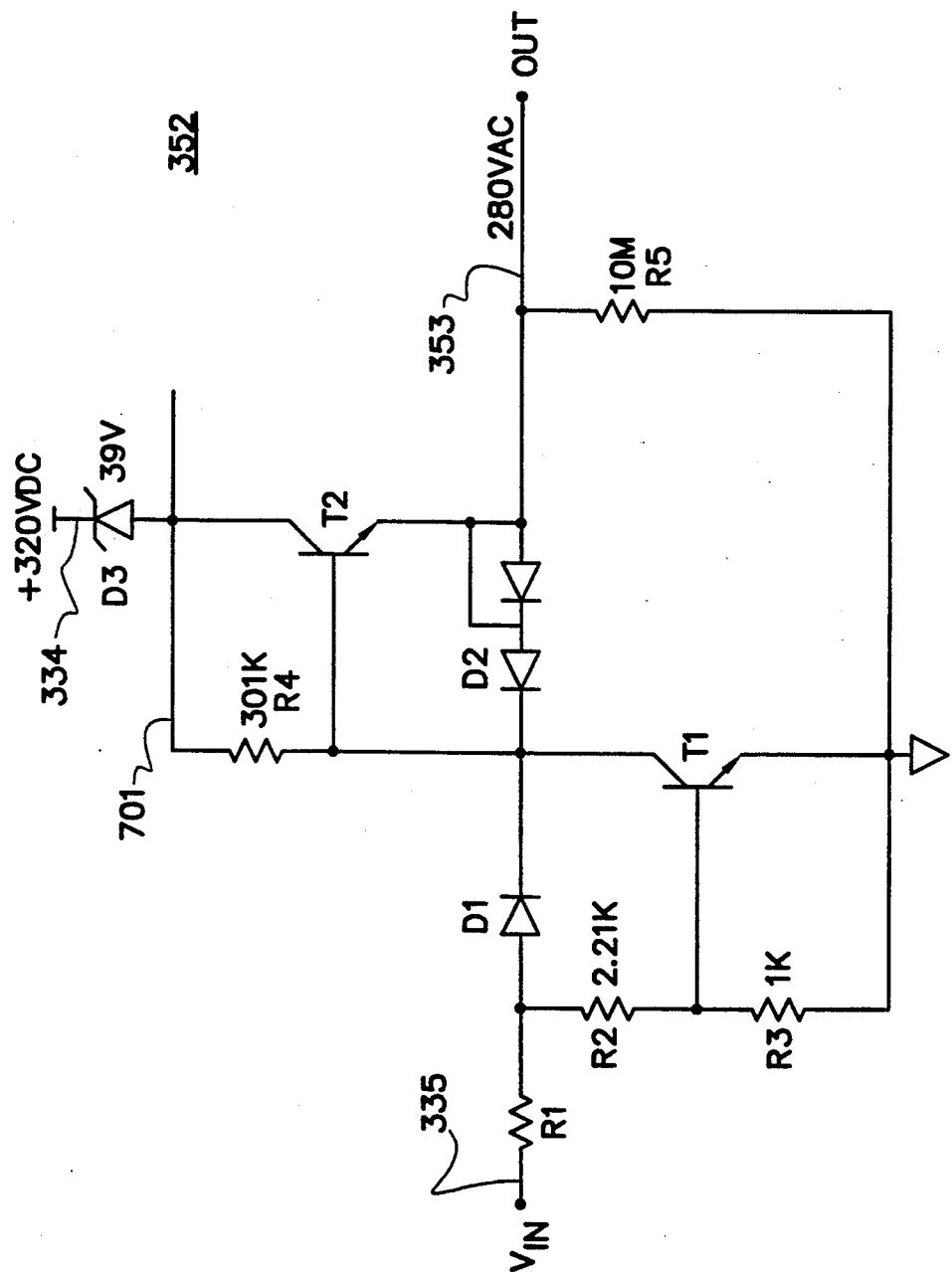
FIG. 4 shows a detailed circuit diagram of a high voltage pulse generator circuit as provided by one aspect of the invention.

Now referring to FIG. 4 which shows the high voltage pulse generator 352. The high voltage pulse amplifier 352 amplifies 5 V pulses from the digital logic at a 60 KHz 10% duty cycle to an output of 280 V pulses at approximately 50% duty cycle. The circuit of FIG. 4 in one embodiment of the invention uses surface mounted technology, with a low surface area, low cost, high reliability and efficiency. The transistors T1 and T2 used in the circuit of FIG. 4 may advantageously be bipolar NPN's which have a rated $V_{CEO}$ of 350 V. The network R1, R2, R3, and D1 is used to drive transistor T1 and yet keep T1 out of saturation. D1 is a Schottky diode used to clamp T1 out of saturation for low voltage amplification. The circuit includes a conventional PN junction high voltage diode with a 600 V reverse breakdown voltage and a higher forward voltage drop and a resistor divider R2 and R3 to keep T1 out of saturation. D2 is a low voltage diode used to create a dead band such that T1 and T2 can never be on at the same time.

In an alternate embodiment of the invention complimentary circuits using NPN and PNP or N—channel and P—channel transistors may be used to gain more efficiency at the risk of turning both devices on at the same time during power up. For high performance the capacitance at node 701 is advantageously kept at a minimum and diode D1 and D2 preferably have low capacitance characteristics. Resistor R4 and T2 perform as an active pull-up component when T1 is turned off.

R5 is used to keep T1's collector voltage below 280 V. In the off mode, which is most of the time, $V_{IN}=0$ volts and the circuit only consumes 28 μA.

Figure 5A:
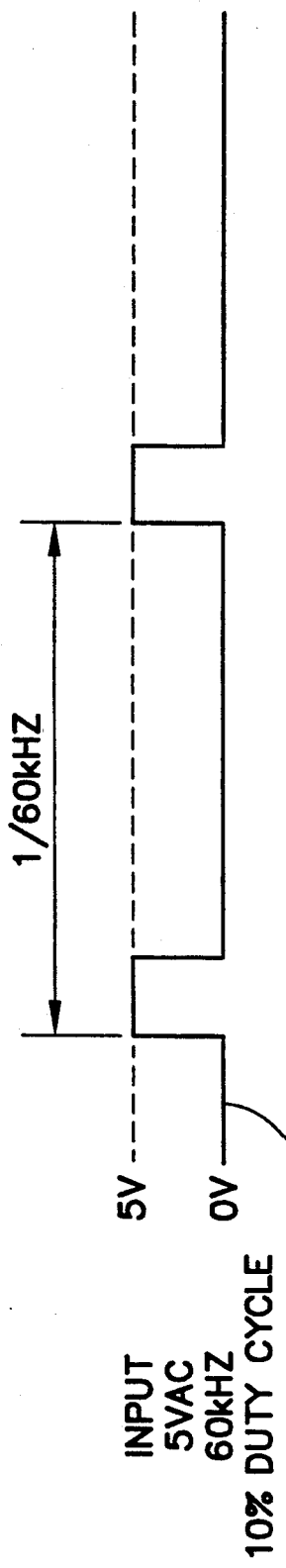
FIGS. 5A and 5B show high voltage pulse generator waveforms.
Figure 5B:
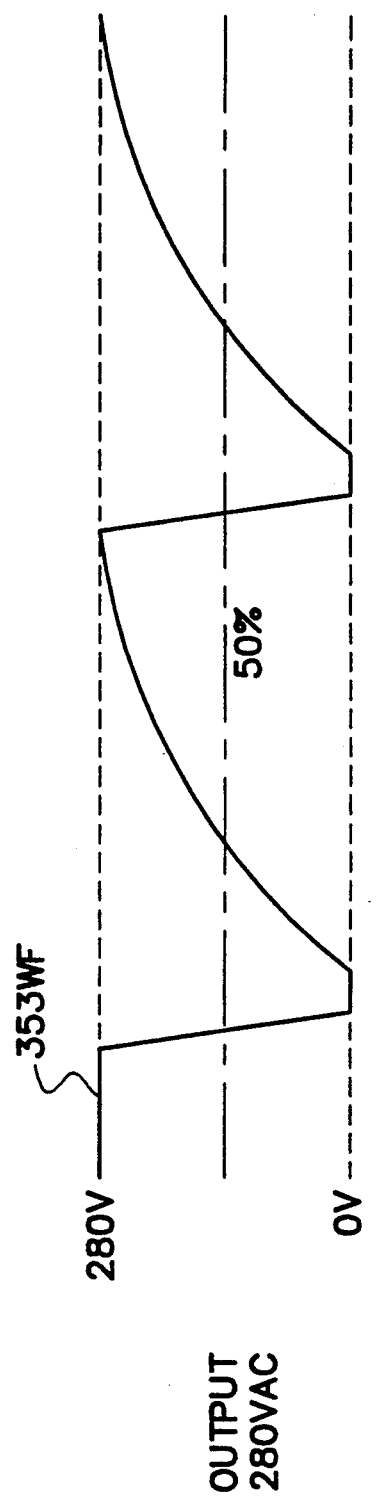

Now referring to FIGS. 5A and 5B which show examples of high voltage amplifier waveforms. The input waveform 335WF is 5 volts at 60 KHz 10% duty cycle. The 10% duty cycle significantly reduces the power consumption of the circuit of the invention. T1 turns on fast and off slowly due to the capacitance on node 701. The output waveform 353WF has approximately a 50% duty cycle at the 140 volt level. The high voltage module 371 requires 280VAC at 60 KHz, and its duty cycle is not critical.

Figure 6:
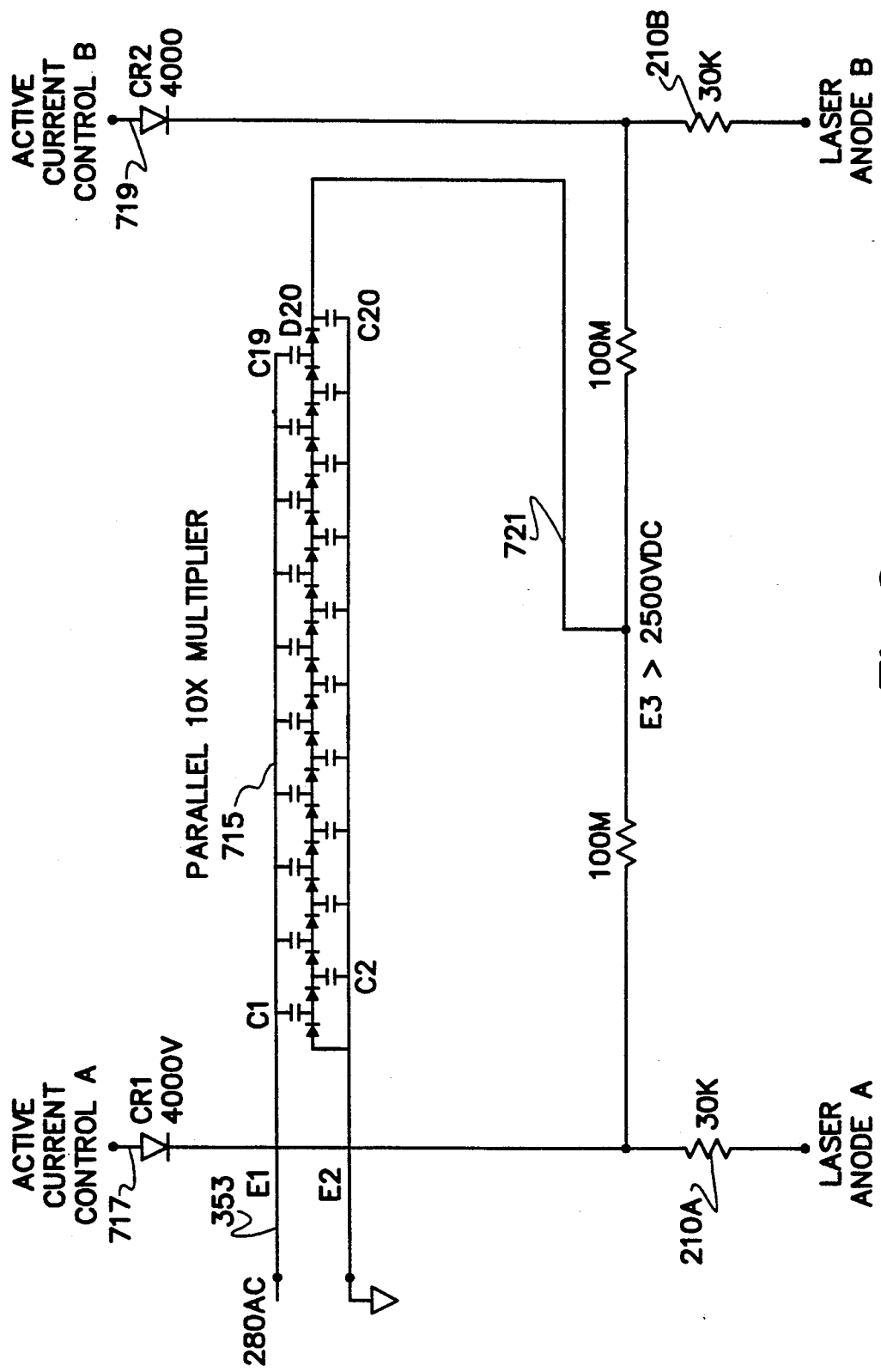
FIG. 6 shows a circuit schematic diagram of a high voltage module of the invention.

Now referring to FIG. 6 which shows a detailed schematic of the circuit for the high voltage module 354 which consists of two high voltage blocking diodes CR1 and CR2 (4,000 PIV) used to protect the active current circuitry during start-up. Two small ballast resistors 210A and 210B have resistance values ranging from 10K to 30K. The prior art used large ballast resistors (1M ohm) which consumed a relatively large amount of power. A parallel ten times voltage multiplier 715 is used to give at least 2,500 VDC on line output 721. The start current for the gyro is 2,500 VDC/100 Meg=25 μA per leg of the gyro. The parallel multiplier 715 has more current driving capability than a series multiplier. The parallel 10× multiplier 715 has 20 diodes and 20 capacitors. D1 through D20 require reverse breakdown characteristics of only 2 times the input peak to peak voltage. The voltage rating on capacitors C1 through C20 progressively increases from 280 V to 2,800 V. C1 through C20 equal 35 pF each. The capacitance on LASER ANODE A 210A and LASER ANODE B 210B is preferably less than 2 pF.

In one embodiment of the invention the circuit is fabricated in a substrate that contains thick film resistors and high voltage diodes and capacitors.

The substrate and components are housed in a high voltage dielectric Ryton (TM) and potted with high dielectric strength filler. Since node 721 (2,500V) is buried in the high voltage module, the resultant part is very reliable. The gyro and high voltage module are advantageously back filled with dry nitrogen. This provides a double barrier for high voltage corona breakdown and leakage.

Figure 7:
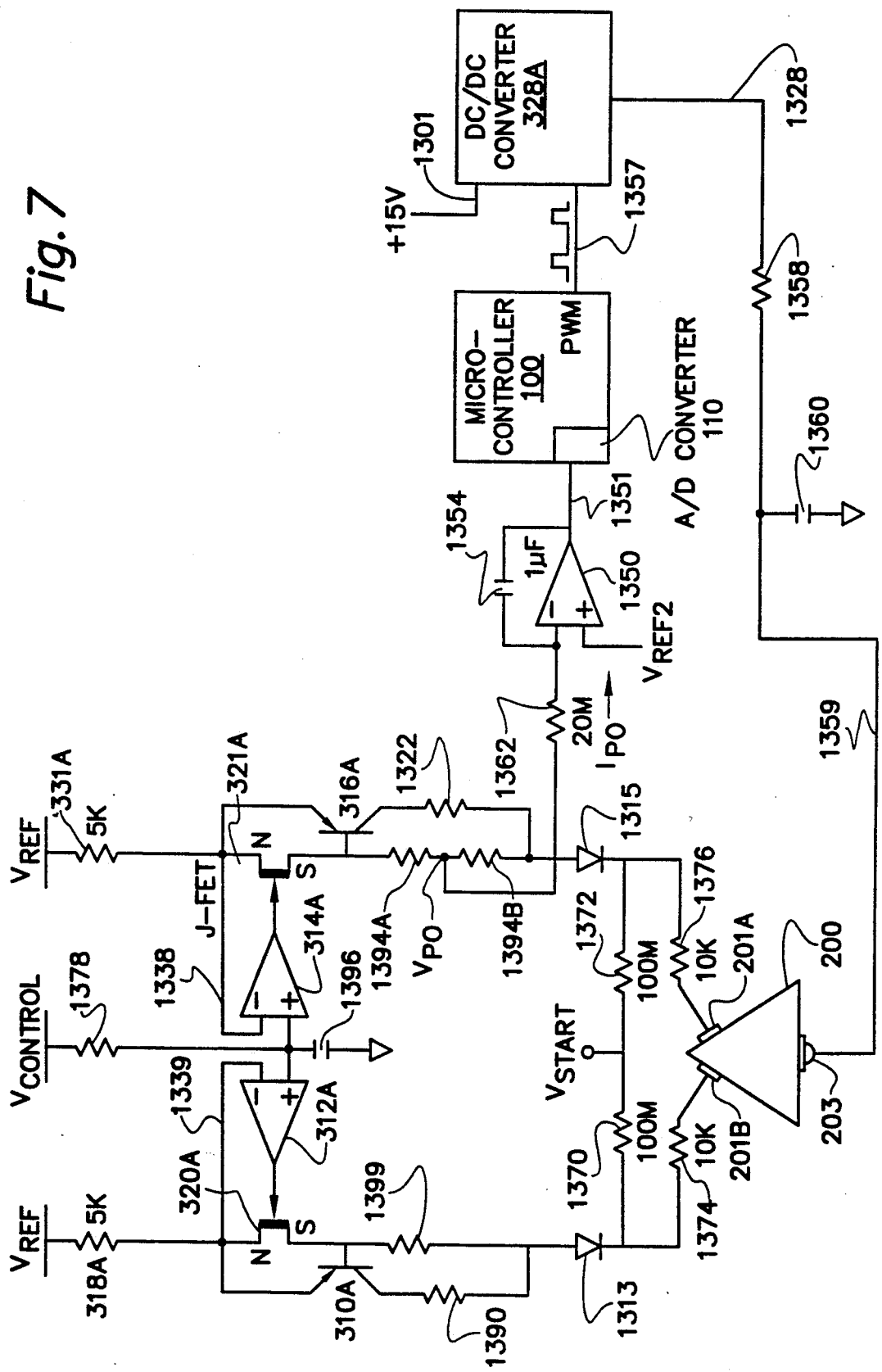
FIG. 7 shows an alternate embodiment of the invention to provide an active current control.

Referring now to FIG. 7, an alternate embodiment of an active current control apparatus as provided by the present invention is shown. The active current control apparatus is comprised of first and second amplifying means 312A, 314A, control JFETs 320A, 321A, first and second output transistors 310A, 316A, integrating amplifier means 1350, micro-controller 100 and pulse width modulated DC/DC converter means 328A. The active current control apparatus 300A operates first and second current supply legs including first and second amplifying means 312A, 314A that are constructed similarly to the two driving legs shown in FIG. 2 comprising first and second driving amplifiers 312, 314. The first and second control JFETs 320A, 321A are advantageously N channel JFETs. A predetermined external voltage $V_{control}$ is applied through resistor 1378 to the non-inverting inputs of the first and second drive amplifiers 312A and 314A. A first terminal of capacitor 1396 is also connected to the non-inverting inputs of the first and second amplifying means for the purposes of filtering the $V_{control}$ voltage. As is the case in the circuit of FIG. 2, feedback lines 1339 and 1338 are connected from the sources of the JFETs, 320A and 321A respectively, to the inverting inputs of the first and second amplifying means 312A and 314A. Reference voltage $V_{REF}$ is introduced into the feedback lines 1339, 1338 through precision resistors 318A and 331A, respectively. The reference voltage $V_{REF}$ may advantageously be approximately +10 volts DC. JFETs 320A, and 321A and output transistors 310A, 316A operate together with resistors 1390, 1399, 1394A, 1394B, 1322 and diodes 1313, 1315 in a manner similar to their similarly arranged counterparts that are described with respect to FIG. 2A and 2B.

Here departing further from the configuration shown in FIG. 2, the collector of the second output transistor 316A is connected to resistor 1394A which is in series with resistor 1394B. An integrating amplifying means 1350 having feedback capacitor 1354 includes a reference voltage $V_{REF2}$ which may advantageously be about 2.5 volts in one example embodiment. A sampled signal $V_{po}$ is tapped between resistors 1394A and 1394B. A small current is sent through resistor 1362 when $V_{po}$ has a value which does not equal $V_{REF2}$ to an inverting input of integrating amplifying means 1350. Since $V_{po}$ is driven to equal $V_{REF2}$ by the DC/DC converter 328A, the current $I_{po}$ is approximately 0. Further, it is important to note that only one leg of the active current source circuit is in the servo loop. This accounts for differences which may exist in the ring laser gyro tube voltages for the two legs. Since the apparatus uses a servo mechanism to adjust only one leg, the currents in both legs are substantially unaltered. The apparatus further takes the ring laser gyro tube voltages into account by reverse biasing the collectors of transistors 310A and 316A by at least 10 volts. Even with this added biasing, the apparatus allows the ring laser gyro to operate with voltages having much lower absolute values of voltage than those found in the prior art.

The integrating amplifying means 1350 provides a signal 1351 to an analog-to-digital input of analog-to-digital converter 110, which is part of micro-controller 100. Micro-controller 100 processes signal 1351 in a well known manner and outputs a pulse width modulated signal (PWM) that is responsive to the signal 1351 to an input of proportional DC/DC converter 328A. A DC/DC converter 328A in turn provides an output 1328, which is proportional to the PWM signal, through an RC filter comprising a resistor 1358 and a capacitor 1360 to the cathode 203 of the ring laser gyro 10. In the example embodiment shown, a positive 15 volts is supplied to a positive input 1301 of the DC/DC converter 328A. Those skilled in the art will appreciate that other equivalent devices may be substituted in the circuit discussed with reference to FIG. 4. For example a transistor coupled to a proportional DC/DC converter may be substituted for the pulse width modulation apparatus discussed above.

In operation, voltage signal $V_{po}$ provides an input to the integrator comprising the integrating amplifying means 1350 and capacitor 1354. The sample voltage is inverted through the integrator which may preferably have a 20 second time constant. The output of the integrating amplifier 1350 is sampled by the micro-controller A/D converter 110. The micro-controller then provides a pulse width modulated signal input to the DC/DC converter 328A. The DC/DC converter operates to bring the sampled point down to the reference voltage $V_{REF2}$ in this example. This configuration has the advantage that all of the power in the circuit is dissipated at the plasma in the ring laser gyro and there is no need for even small ballast resistors. Some nominal values of resistance are shown in order to provide a better understanding of this example of an embodiment of the invention.

Still referring to FIG. 7, in one prototype example embodiment of the invention constructed by Honeywell Inc., an active current control circuit apparatus was built using 2N3743 PNP transistor dies in hybrid packages for the output transistors. It was later found that a significant cost reduction could be achieved by substituting an MMBT6520 PNP transistor in a surface mounted SOT-23 package. The only high frequency component required in the circuitry is the 2N3743 transistor that has a $F_T$ of greater then 30 MHz and a collector-base capacitance of less than 15 pF. The cathode voltage servos to minimize the power dissipation in the electronics which is important to a modular electronics design since all the electronics are located in the gyro housing. One of the 2N3743 collector voltages, namely $V_{po}$, is monitored using a 22M ohm resistor, which in turn supplies a small current to an integrator. The output of the integrator then controls the input to the DC/DC converter. The closed loop time constant is approximately 0.5 seconds. In one example, as the input to the A/D converter varies from about 0 to 5 volts, the corresponding pulse width modulated signal has a duty cycle ranging from about 45% to about 30%.

Ring laser gyros exhibit a negative resistance when operating. The negative resistance of the ring laser gyro results in approximately constant power dissipation. The cathode voltage automatically servos to a lower voltage as the current increases, thereby conserving power. The design of FIG. 6 delivers about 200–400 milliwatts of power to the gyro while dissipating a maximum of about 50 milliwatts.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

For example, a dual ring laser gyro system may be constructed using the present invention wherein the active current is supplied to the cathodes instead of the anodes of a ring laser gyro. In such a case the PNP transistors employed in the examples herein are replaced with NPN transistors, N-channel FETs are replaced by P-channel FETs and the polarities of the power supplies are reversed.

What is claimed is:

1. A ring laser gyro having a laser and a housing wherein the ring laser gyro is capable of being started with high voltage, the ring laser gyro comprising:
   a. a low voltage power supply connection means to provide a hermetically sealed low voltage supply connection within the housing; and
   b. high voltage starting means for starting the ring laser gyro wherein the high voltage starting means is contained within the housing and is connected to the low voltage power supply connection means within the housing.

2. The ring laser gyro of claim 1 wherein the hermetically sealed low voltage supply connection seals to less than $10^{-6}$ Torr.

3. The ring laser gyro of claim 1 wherein the low voltage supply connection provides a voltage of 320 volts DC.

4. The ring laser gyro of claim 3 wherein the low voltage supply connection further provides a logic level voltage.

5. A high voltage starting apparatus for a ring laser gyro comprising:
   a. high voltage pulse generator means for converting a direct current low voltage to an alternating current signal wherein the high voltage pulse generator means is connected to the direct current low voltage and has a low voltage alternating current output; and
   b. a voltage conversion means connected to the low voltage alternating current output wherein the voltage conversion means provides an active current control output and a laser anode supply output.

6. The high voltage starting apparatus of claim 5 further including a low voltage supply means for providing the direct current low voltage wherein the low voltage supply means also provides a logic level voltage.

7. The high voltage starting apparatus of claim 5 wherein the ring laser gyro further comprises a first and second laser beam and the voltage conversion means provides a first and second anode supply output and a first and second active current control output.

8. The high voltage starting apparatus of claim 5 wherein the high voltage pulse generator means further comprises:
   a. first resistor means with a first resistor means input connected to the alternating logic level input wherein the first resistor means has a first resistor output;
   b. second resistor means with a second resistor input connected to the first resistor output wherein the second resistor means has a second resistor output;
   c. third resistor means with a third resistor input connected to the second resistor output wherein the third resistor means has a third resistor output connected to ground;
   d. first diode means with a first diode input connected to the first resistor output wherein the first diode means has a first diode output;
   e. first transistor means with a first base connected to the second resistor output, a first collector connected to the first diode output and a first emitter connected to ground;
   f. fourth resistor means with a fourth resistor input connected to the first diode output wherein the fourth resistor means has a fourth resistor output;

g. second transistor means with a second base connected to the first diode output, a second collector connected to the fourth resistor output and a second emitter connected to the low voltage alternating current output;

h. second diode means with a second diode input connected to a low voltage alternating current output wherein the second diode means has a second diode output connected to the first diode output;

i. third diode means with a third diode input connected to the low voltage alternating current output wherein the third diode means has a third diode output connected to the low voltage alternating current output;

j. fourth diode means with a fourth diode input connected to the fourth resistor output wherein the fourth diode means has a fourth diode output connected to the low voltage supply; and k. fifth resistor means with a fifth resistor input connected to the third resistor output wherein the fifth resistor means has a fifth resistor output connected to the low voltage alternating current output.

9. The high voltage starting apparatus of claim 5 wherein the laser gyro has a first laser anode and a second laser anode, and wherein the voltage conversion means further comprises:

a. first active current controlled voltage supply;

b. second active current controlled voltage supply;

c. first diode means with an input connected to the first active current controlled voltage supply wherein the first diode means has a first diode output;

d. second diode means with an input connected to the second active current controlled voltage supply wherein the second diode means has a second diode output;

e. voltage multiplier means connected to the low voltage alternating current supply and ground having a multiplied voltage output at a predetermined voltage multiplication ratio;

f. first resistor means with a first resistor input connected to the first diode output wherein the first resistor means has a first resistor output connected to the multiplied voltage output;

g. second resistor means with an second resistor input connected to the multiplied voltage output wherein the second resistor means has a second resistor output connected to the second diode output;

h. third resistor means with a third resistor input connected to the first diode output wherein the third resistor means has a third resistor output connected to the first laser anode; and i. fourth resistor means with a fourth resistor input connected to the second diode output wherein the fourth resistor means has a fourth resistor output connected to the second laser anode.

10. The high voltage starting apparatus of claim 9 further including an active current control apparatus comprising:

a. means for generating a digital control signal representative of a current value;

b. means coupled to the digital control signal generating means for translating the digital control signal into an analog signal; and c. means coupled to the analog signal for supplying driving current to the anode of the ring laser gyro in response to the analog signal and in proportion to the digital control signal.

11. The high voltage starting apparatus of claim 10 wherein the means for generating a digital control signal representative of a current value comprises a digital controller.

12. The high voltage starting apparatus of claim 11 wherein the digital controller comprises a microprocessor including first and second analog-to-digital converter input ports.

13. The high voltage starting apparatus of claim 12 wherein the active current control apparatus further includes a means for running a built-in-test of the active current control apparatus.

14. The high voltage starting apparatus of claim 10 wherein the ring laser gyro includes a first anode and a second anode and the means coupled to the analog signal for supplying driving current to the anode of the ring laser gyro comprises a first current source leg and a second current source leg, wherein the first current source leg is coupled to the first anode and the second current source leg is coupled to the second anode.

15. The high voltage starting apparatus of claim 14 wherein each of the first and second current control legs comprise:

a. an amplifying means coupled to the analog signal from the translating means, wherein the amplifying means includes an output and a feedback means;

b. a field effect transistor means including a gate, drain and source wherein the gate is coupled to the output of the amplifying means;

c. a transistor means having an emitter, base and collector wherein the base is connected to the drain of the field effect transistor means, and the emitter is connected to the feedback means;

d. a first resistance means connected at a first terminal to the collector;

e. a second resistance means connected at a first terminal to the base;

f. a diode means having an anode and a cathode and connected at its anode to a second terminal of each of the first and second resistance means; and g. a third resistance means connected between the anode of the diode means and one of the first and second anodes of the ring laser gyro, wherein the transistor means has a worst case Beta operating parameter and the first, second and third resistance means are selected to insure operation of the transistor in a desired current range for the worst case Beta.

16. The high voltage starting apparatus of claim 10 further comprising a means coupled to the means for supplying drive current for summing the total current supplied by the current driving means.

17. The high voltage starting apparatus of claim 9 further including an active current control apparatus comprising:

a. means for generating a digital control signal representative of a current value;

b. means coupled to the digital control signal generating means for translating the digital control signal into an analog signal; and c. means coupled to the analog signal for supplying driving current in response to the analog signal and in proportion to the digital control signal.

18. The high voltage starting apparatus of claim 17 wherein the means for generating a digital control signal representative of a current value comprises a digital controller.

19. The high voltage starting apparatus of claim 18 wherein the digital controller comprises a microprocessor including first and second analog-to-digital converter input ports.

20. The high voltage starting apparatus of claim 19 wherein the active current control apparatus further includes a means for running a built-in-test of the active current control apparatus connected between the active current control apparatus and the digital controller.

21. The high voltage starting apparatus of claim 17 wherein the means coupled to the analog signal for supplying driving current comprises a first current source leg and a second current source leg.

22. The high voltage starting apparatus of claim 17 further comprising a means, coupled to means for supplying driving current, for summing the total current supplied by the current driving means.

23. The high voltage starting apparatus of claim 17 wherein the means for generating a digital control signal further includes a means for generating a start circuit control signal and the active current control apparatus further comprises a means for providing a high voltage starting signal coupled to the start circuit control signal at a control input and coupled to one of the first and second anodes of the ring laser gyro.

24. The high voltage starting apparatus of claim 17 wherein the ring laser gyro also includes a cathode and the apparatus further comprises a proportional DC/DC voltage converter means having an input and an output wherein the input is coupled to the driving current supply means at a sampled point where a sampled signal is present and the output is coupled to the cathode of the ring laser gyro so as to control the voltage level at the cathode of the ring laser gyro in response to the sampled signal.

25. The high voltage starting apparatus of claim 24 wherein the proportional DC/DC voltage converter means further comprises:
   a. an integrator means coupled at an input to the sampled point;
   b. a transistor means having a base and an emitter wherein the base is coupled to an output of the integrator means;
   c. an integrated circuit means for converting DC voltage in proportion to an input signal wherein the integrated circuit means includes an input connected to the transistor emitter and an output for supplying a converted voltage; and
   d. a filtering circuit means connected between the converted voltage output and the cathode of the ring laser gyro.

26. The high voltage starting apparatus of claim 16 wherein the integrated circuit means provides a converted output voltage in the range of about 0 to about 550 volts DC.

27. A high voltage starting apparatus for a laser gyro having a laser block with a first volume wherein the high voltage starting apparatus has a second volume wherein the first volume is greater than the second volume.

* * * * *